(12) United States Patent
Sahota (10) Patent No.: US 7,444,166 B2
(45) Date of Patent: Oct. 28, 2008

(54) WIRELESS DIVERSITY RECEIVER WITH SHARED RECEIVE PATH

(75) Inventor: Gurkanwal Singh Sahota, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 292 days.

(21) Appl. No.: 10/779,053

(22) Filed: Feb. 12, 2004

(65) Prior Publication Data

US 2005/0181752 A1    Aug. 18, 2005

(51) Int. Cl.
H04B 1/28 (2006.01)
(52) U.S. Cl. .................. 455/553.1; 455/140; 455/277.1
(58) Field of Classification Search .............. 455/552.1, 455/553.1, 132–141, 269–278.1
See application file for complete search history.

(56) References Cited

U.S. PATENT DOCUMENTS

| | | | | |
|---|---|---|---|---|
| 5,835,853 A | * | 11/1998 | Enoki et al. ............... | 455/180.1 |
| 5,940,452 A | * | 8/1999 | Rich .......................... | 375/347 |
| 5,999,990 A | * | 12/1999 | Sharrit et al. .................. | 710/8 |
| 6,952,594 B2 | * | 10/2005 | Hendin ..................... | 455/552.1 |
| 6,954,446 B2 | * | 10/2005 | Kuffner ...................... | 370/335 |
| 2002/0132597 A1 | | 9/2002 | Peterzell et al. | |
| 2003/0076797 A1 | | 4/2003 | Lozano ....................... | 370/334 |
| 2003/0125040 A1 | | 7/2003 | Walton et al. ............... | 455/464 |
| 2003/0203743 A1 | * | 10/2003 | Sugar et al. .............. | 455/550.1 |
| 2004/0121753 A1 | * | 6/2004 | Sugar et al. ................. | 455/333 |
| 2004/0204104 A1 | | 10/2004 | Horng et al. ............. | 455/562.1 |
| 2004/0253955 A1 | * | 12/2004 | Love et al. .................. | 455/442 |
| 2005/0079847 A1 | * | 4/2005 | Arafa ......................... | 455/272 |
| 2005/0118977 A1 | * | 6/2005 | Drogi et al. ................. | 455/323 |
| 2005/0277387 A1 | * | 12/2005 | Kojima et al. ................. | 455/78 |

FOREIGN PATENT DOCUMENTS

JP    2001285114    10/2001

OTHER PUBLICATIONS

MSM6500 Chipset Solution, Qualcomm Incorporated.
MSM6000 Chipset Solution, Qualcomm Incorporated.
International Search Report, PCT/US05/004861 - International Search Authority - European Patent office - May 19, 2005.

(Continued)

Primary Examiner—Edward Urban
Assistant Examiner—Adeel Haroon
(74) Attorney, Agent, or Firm—Todd E. Marlette; Ramin Mobarhan; Thomas R. Rouse (57) ABSTRACT

A low-cost diversity receiver includes two receiver units for a primary path and a secondary/diversity path. The first receiver unit is compliant with, for example, IS-98D requirements. The second receiver unit is not fully compliant with the IS-98D requirements (e.g., may meet requirements for sensitivity but not for out-of-band rejection). The second receiver unit is wideband and designed with lower power consumption, less area, and lower cost than the first receiver unit. For a multi-antenna receiver, the two receiver units are used to simultaneously process two received signals from two antennas. For a single-antenna receiver, one of the two receiver units is used to process a received signal from one antenna. For a dual-band design, each receiver unit can operate at two frequency bands. Narrowband circuit blocks are used for the first receiver unit, and wideband circuit blocks are used for the second receiver unit.

33 Claims, 7 Drawing Sheets

OTHER PUBLICATIONS

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.

* cited by examiner

WIRELESS DIVERSITY RECEIVER WITH SHARED RECEIVE PATH

BACKGROUND

I. Field

The present invention relates generally to electronics, and more specifically to a diversity receiver for wireless communication.

II. Background

In a wireless communication system, a transmitter modulates data onto a radio frequency (RF) carrier signal to generate an RF modulated signal that is more suitable for transmission. The transmitter then transmits the RF modulated signal via a wireless channel to a receiver. The transmitted signal may reach the receiver via one or more propagation paths (e.g., a line-of-sight path and/or reflected paths). The characteristics of the propagation paths may vary over time due to various phenomena such as fading and multipath. Consequently, the transmitted signal may experience different channel conditions and may be received with different amplitudes and/or phases over time.

To provide diversity against deleterious path effects, multiple antennas may be used to receive the RF modulated signal. At least one propagation path typically exists between the transmit antenna and each of the receive antennas. If the propagation paths for different receive antennas are independent, which is generally true to at least an extent, then diversity increases and the received signal quality improves when multiple antennas are used to receive the RF modulated signal.

A multi-antenna receiver conventionally has one RF receiver processing path (or simply, "receive path") for each frequency band and each receive antenna. For example, if the multi-antenna receiver is designed to operate at two frequency bands (e.g., cellular and PCS bands), then it would normally have four receive paths for the two frequency bands for each of the two receive antennas. Each receive path includes various circuit blocks (e.g., amplifiers, filters, mixers, and so on) used to condition and process a received signal at a designated frequency band from an associated antenna. The circuit blocks are typically designed to meet various system requirements such as linearity, dynamic range, sensitivity, out-of-band rejection, and so on, as is known in the art. In conventional receiver designs, the receive path is often replicated for each frequency band of each of the receive antennas, with circuit modifications (as needed) for different frequency bands. The replication of the receive path circuitry results in higher cost, larger area, and higher power consumption for the multi-antenna receiver, all of which are undesirable. There is therefore a need in the art for a low-cost diversity receiver.

SUMMARY

A low-cost diversity receiver having good performance is described herein. The diversity receiver includes two (or possibly more) receiver units. The first receiver unit is for a primary path and is compliant with applicable system requirements (e.g., IS-98D, cdma2000, and/or 3GPP requirements). The second receiver unit is for a secondary/diversity path and has a receive path that is shared by two or more frequency bands (e.g., cellular, PCS, GPS, and so on). This shared design requires fewer circuit components to support multiple frequency bands, reduces power consumption, and lowers costs. Furthermore, the second receiver unit is not fully compliant with all of the system requirements. For example, the second receiver unit may be designed to operate over a smaller dynamic range and to meet requirements for sensitivity but not for out-of-band rejection of large amplitude "jammers", which are undesired signals of a particular level or higher. This non-compliant design allows the second receiver unit to be implemented with lower power consumption, less area, and lower cost. The second receiver unit can provide good performance under most operating conditions. For a multi-antenna receiver, the two receiver units can be used to simultaneously process two input signals from two antennas. For a single-antenna receiver, one of the two receiver units may be selected, based on the operating conditions, to process a single input signal from one antenna.

In an exemplary embodiment, a dual-band, dual-path receiver with two receiver units is described. Each receiver unit can operate at one of two frequency bands. The first receiver unit includes first and second amplifiers, first and second downconverters, and a first lowpass filter. The first amplifier amplifies a first input signal for a first frequency band (e.g., cellular band) and provides a first amplified signal. The first downconverter translates the first amplified signal in frequency (e.g., from RF down to baseband) and provides a first baseband signal. The second amplifier amplifies a second input signal for a second frequency band (e.g., PCS band) and provides a second amplified signal. The second downconverter translates the second amplified signal in frequency and provides a second baseband signal. The first lowpass filter filters the first or second baseband signal and provides a first filtered signal.

The second receiver unit includes a third amplifier, a third downconverter, and a second lowpass filter. The third amplifier amplifies a third input signal for the first or second frequency band and provides a third amplified signal. The third downconverter translates the third amplified signal down in frequency and provides a third baseband signal. The second lowpass filter filters the third baseband signal and provides a second filtered signal. The first amplifier and first downconverter are narrowband and cover the first frequency band. The second amplifier and second downconverter are also narrowband and cover the second frequency band. The third amplifier and third downconverter are wideband, cover the first and second frequency bands, and are shared by these two frequency bands.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 4 shows a dual-band, dual-path receiver;

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
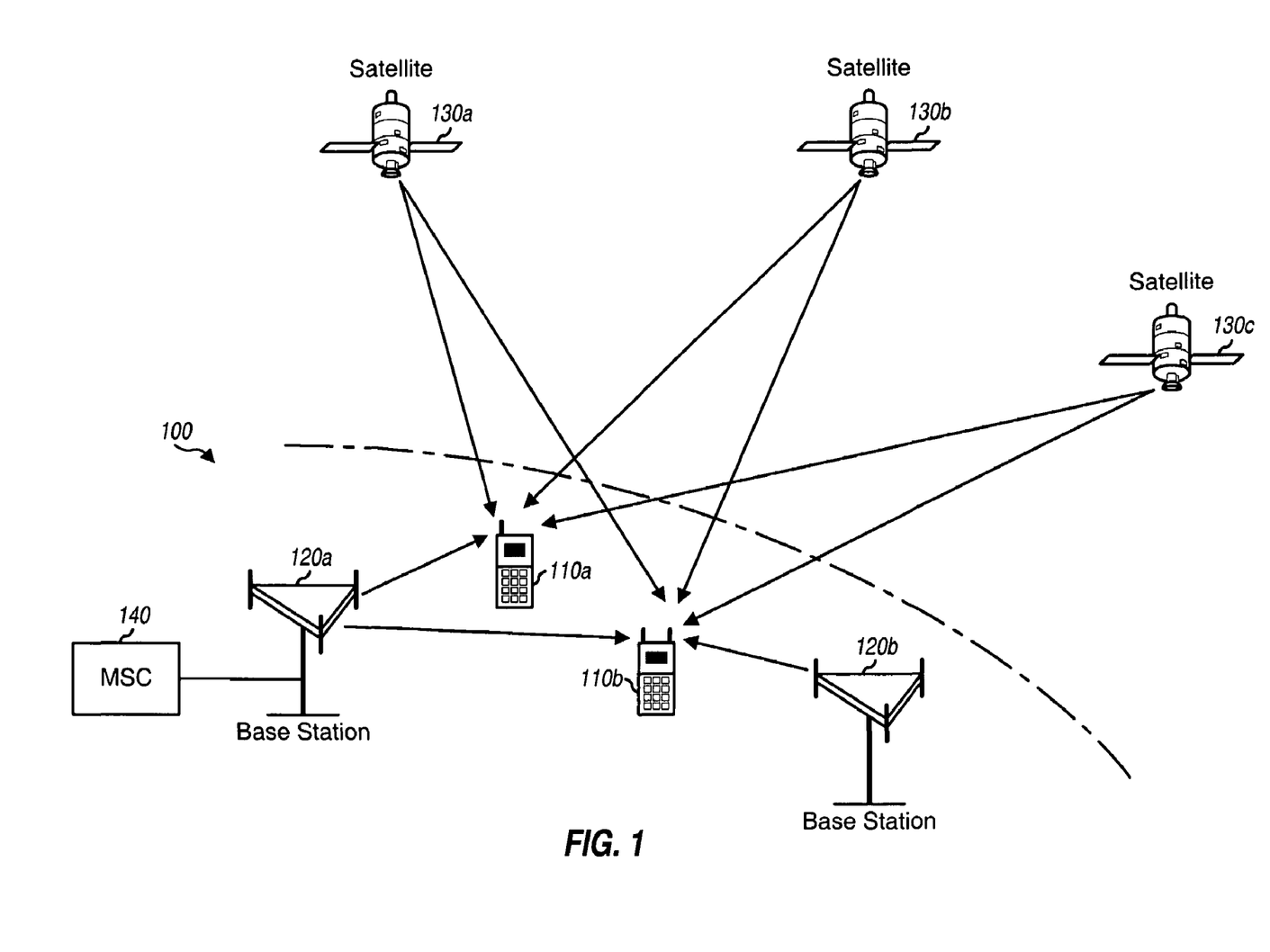
FIG. 1 shows a wireless communication system.

FIG. 1 shows a wireless communication system 100 in which a number of wireless terminals communicate with a number of base stations. For simplicity, only two terminals 110a and 10b and two base stations 120a and 120b are shown in FIG. 1. A terminal may also be referred to as a remote station, a mobile station, an access terminal, a user equipment (UE), a wireless communication device, a cellular phone, or some other terminology. Terminal 110a is equipped with a single antenna, and terminal 110b is equipped with two antennas. A base station is a fixed station and may also be referred to as an access point, a Node B, or some other terminology. A mobile switching center (MSC) 140 couples to the base stations and provides coordination and control for these base stations.

A terminal may or may not be capable of receiving signals from satellites 130. Satellites 130 may belong to a satellite positioning system such as the well-known Global Positioning System (GPS). Each GPS satellite transmits a GPS signal encoded with information that allows GPS receivers on earth to measure the time of arrival of the GPS signal. Measurements for a sufficient number of GPS satellites can be used to accurately estimate a three-dimensional position of a GPS receiver. A terminal may also be capable of receiving signals from other types of transmitting sources such as a Bluetooth transmitter, a Wireless Fidelity (Wi-Fi) transmitter, a wireless local area network (WLAN) transmitter, an IEEE 802.11 transmitter, and so on.

In FIG. 1, each terminal 110 is shown as receiving signals from multiple transmitting sources simultaneously, where a transmitting source may be a base station or a satellite. In general, a terminal may receive signals from zero, one, or multiple transmitting sources at any given moment. For multi-antenna terminal 110b, the signal from each transmitting source is received by each of the multiple antennas at the terminal, albeit at different amplitudes and/or phases.

System 100 may be a Code Division Multiple Access (CDMA) system, a Time Division Multiple Access (TDMA) system, or some other wireless communication system. A CDMA system may implement one or more CDMA standards such as IS-95, IS-2000 (also commonly known as "1x"), IS-856 (also commonly known as "1xEV-DO"), Wideband-CDMA (W-CDMA), and so on. A TDMA system may implement one or more TDMA standards such as Global System for Mobile Communications (GSM). The W-CDMA standard is defined by a consortium known as 3GPP, and the IS-2000 and IS-856 standards are defined by a consortium known as 3GPP2. These standards are known in the art.

System 100 operates on one or more specific frequency bands. Table 1 lists various frequency bands in which system 100 may operate, as well as the frequency band for GPS.

TABLE 1

| Frequency Band | Frequency Range |
| --- | --- |
| Personal Communication System (PCS) | 1850 to 1990 MHz |
| Cellular | 824 to 894 MHz |
| Digital Cellular System (DCS) | 1710 to 1880 MHz |
| GSM900 | 890 to 960 MHz |

TABLE 1-continued

| Frequency Band | Frequency Range |
| --- | --- |
| International Mobile Telecommunications-2000 (IMT-2000) | 1920 to 2170 MHz |
| CDMA450 | 411 to 493 MHz |
| JCDMA | 832 to 925 MHz |
| KPCS | 1750 to 1870 MHz |
| GPS | 1574.4 to 1576.4 MHz |

The PCS band is also known as GSM1900, the DCS band is also known as GSM1800, and the cellular band is also known as an Advanced Mobile Phone System (AMPS) band. System 100 may also operate on a frequency band that is not listed in Table 1.

For each of the frequency bands listed in Table 1 (except for GPS), one frequency range is used for the forward link (i.e., downlink) from the base stations to the terminals, and another frequency range is used for the reverse link (i.e., uplink) from the terminals to the base stations. As an example, for the cellular band, the 824 to 849 MHz range is used for the reverse link, and the 869 to 894 MHz range is used for the forward link.

A terminal may be a single-band terminal or a multi-band terminal. A single-band terminal supports operation on one specific frequency band (e.g., cellular or PCS). A multi-band terminal supports operation on multiple frequency bands (e.g., cellular and PCS) and typically operates on one of the supported bands at any given moment. A multi-band terminal can communicate with different wireless communication systems operating on different frequency bands.

Low-cost receivers that can provide good performance are described herein. These receivers may be used for (1) terminals with single or multiple antennas, (2) terminals supporting multiple frequency bands, and (3) terminals with or without GPS capability. Some exemplary receivers are described below.

Figure 2:
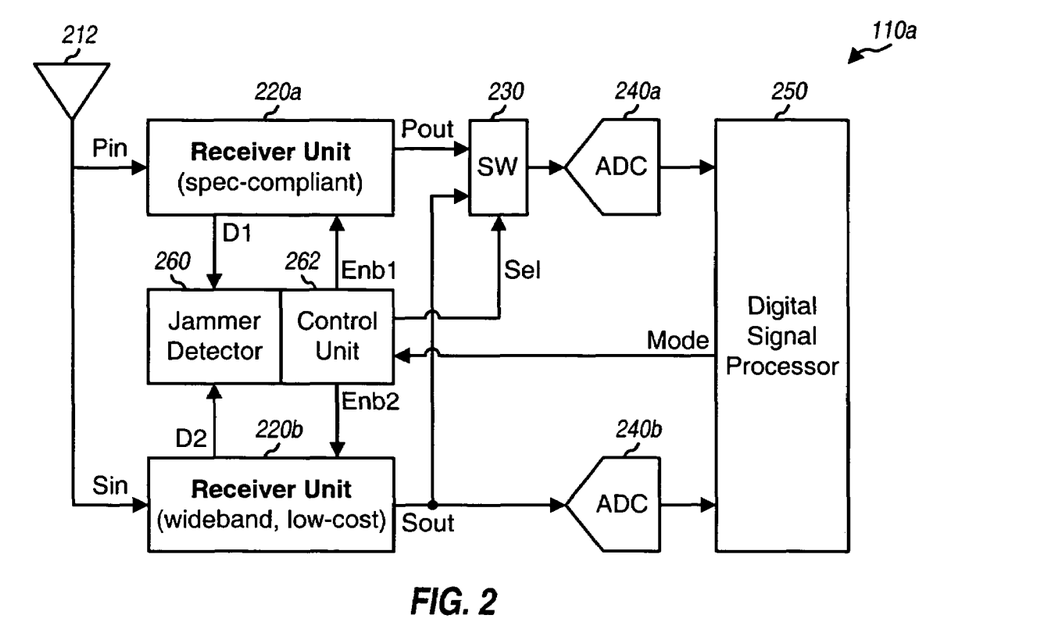
FIG. 2 shows a single-antenna terminal.

FIG. 2 shows a block diagram of an embodiment of single-antenna terminal 110a. In this embodiment, terminal 110a includes a single antenna 212 and two receiver units 220a and 220b for two receive paths. Antenna 212 receives RF modulated signals from base stations 120 and/or satellites 130 and provides a received signal that includes versions of the RF modulated signals from these transmitting sources. Each receiver unit 220 processes the received signal from antenna 212 and provides a respective output baseband signal. Receiver unit 220a is designated as the primary path, is designed to meet applicable system requirements (e.g., for linearity, dynamic range, sensitivity, out-of-band rejection, and so on), and may be used for all operating conditions. Receiver unit 220b is designated as the secondary path, is wideband and designed based on less stringent requirements, and may be used for most operating conditions. Exemplary designs for receiver units 220a and 220b are described below.

A switch (SW) 230 receives the two output baseband signals (Pout and Sout) from receiver units 220a and 220b, selects one of the two signals based on a Sel signal, and provides the selected output baseband signal to an analog-to-digital converter (ADC) 240a. ADC 240a digitizes the selected output baseband signal and provides a first stream of data samples to a digital signal processor (DSP) 250 for further processing. An ADC 240b receives and digitizes the output baseband signal from receiver unit 220b and provides a second stream of data samples to DSP 250. Although not shown in FIG. 2 for simplicity, each output baseband signal and each data sample stream may be a complex signal/stream having an inphase (I) component and a quadrature (Q) component.

For the embodiment shown in FIG. 2, a jammer detector 260 receives a first detector input signal (D1) from receiver unit 220a and a second detector input signal (D2) from receiver unit 220b, detects for the presence of large amplitude jammers in the received signal, and provides a jammer status signal indicating whether large amplitude jammers are present in the received signal. A control unit 262 receives the jammer status signal from jammer detector 260 and a Mode signal from DSP 250, which indicates the operating mode of terminal 110a. Control unit 262 provides the Enb1 and Enb2 signals used to enable receiver units 220a and 220b, respectively, and the Sel signal used by switch 230 to select one of the two output baseband signals. For example, control unit 262 may select (1) receiver unit 220a if large amplitude jammers are detected in the received signal and (2) receiver unit 220b otherwise. Control unit 262 may also enable both receiver units 220a and 220b if signals from two systems (e.g., wireless cellular and GPS) are to be processed simultaneously.

In one configuration, either receiver unit 220a or 220b is selected for use at any given moment, depending on the operating conditions. For this configuration, ADC 240b may be omitted since only one system needs to be processed at any given moment. In another configuration, both receiver units 220a and 220b may be active at the same time to simultaneously process signals from two different systems (e.g., wireless cellular and GPS). For this configuration, switch 230 may be omitted and receiver units 220a and 220b may provide their output baseband signals directly to ADCs 240a and 240b, respectively.

Figure 3:
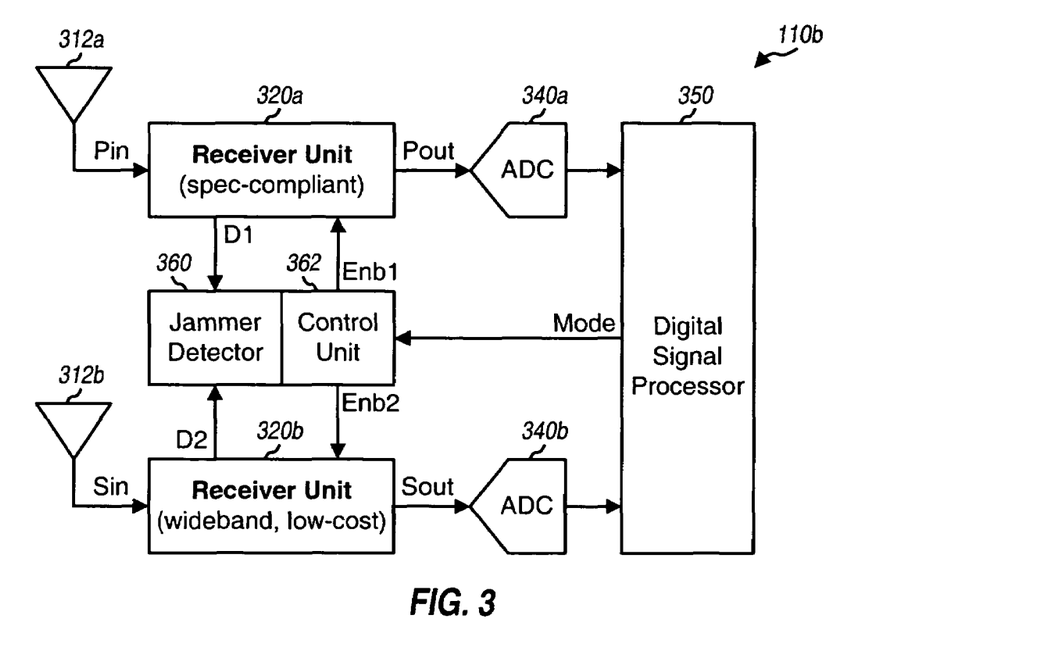
FIG. 3 shows a multi-antenna terminal.

FIG. 3 shows a block diagram of an embodiment of multi-antenna terminal 110b. In this embodiment, terminal 110b includes two antenna 312a and 312b and two receiver units 320a and 320b. The two antennas 312a and 312b may be formed in various manners at terminal 110b (e.g., with printed traces on a circuit board, wire conductors, and so on), as is known in the art. Each receiver unit 320 processes the received signal from one antenna 312 and provides a respective output baseband signal. Receiver unit 320a is designated as the primary path, is designed to meet applicable system requirements, and may be used for all operating conditions. Receiver unit 320b is designated as the secondary/diversity path, is wideband and designed based on less stringent requirements, and may be used for most operating conditions. In one configuration, either receiver unit 320a or 320b is selected for use at any given moment, depending on the operating conditions. In another configuration, both receiver units 320a and 320b may be active at the same time to simultaneously process two received signals for the same wireless system, to achieve diversity. In yet another configuration, both receiver units 320a and 320b may simultaneously process signals for two different systems (e.g., wireless cellular and GPS). Exemplary designs for receiver units 320a and 320b are described below.

ADC 340a receives and digitizes the first output baseband signal (Pout) from receiver unit 320a and provides a first data sample stream to a DSP 350. An ADC 340b receives and digitizes the second output baseband signal (Sout) from receiver unit 320b and provides a second data sample stream to DSP 350. A jammer detector 360 detects for the presence of large amplitude jammers in the first and/or second received signal and provides a jammer status signal. A control unit 362 enables one or both receiver units 320a and 320b based on the jammer status signal from jammer detector 360 and the Mode signal from DSP 350.

Figure 4:
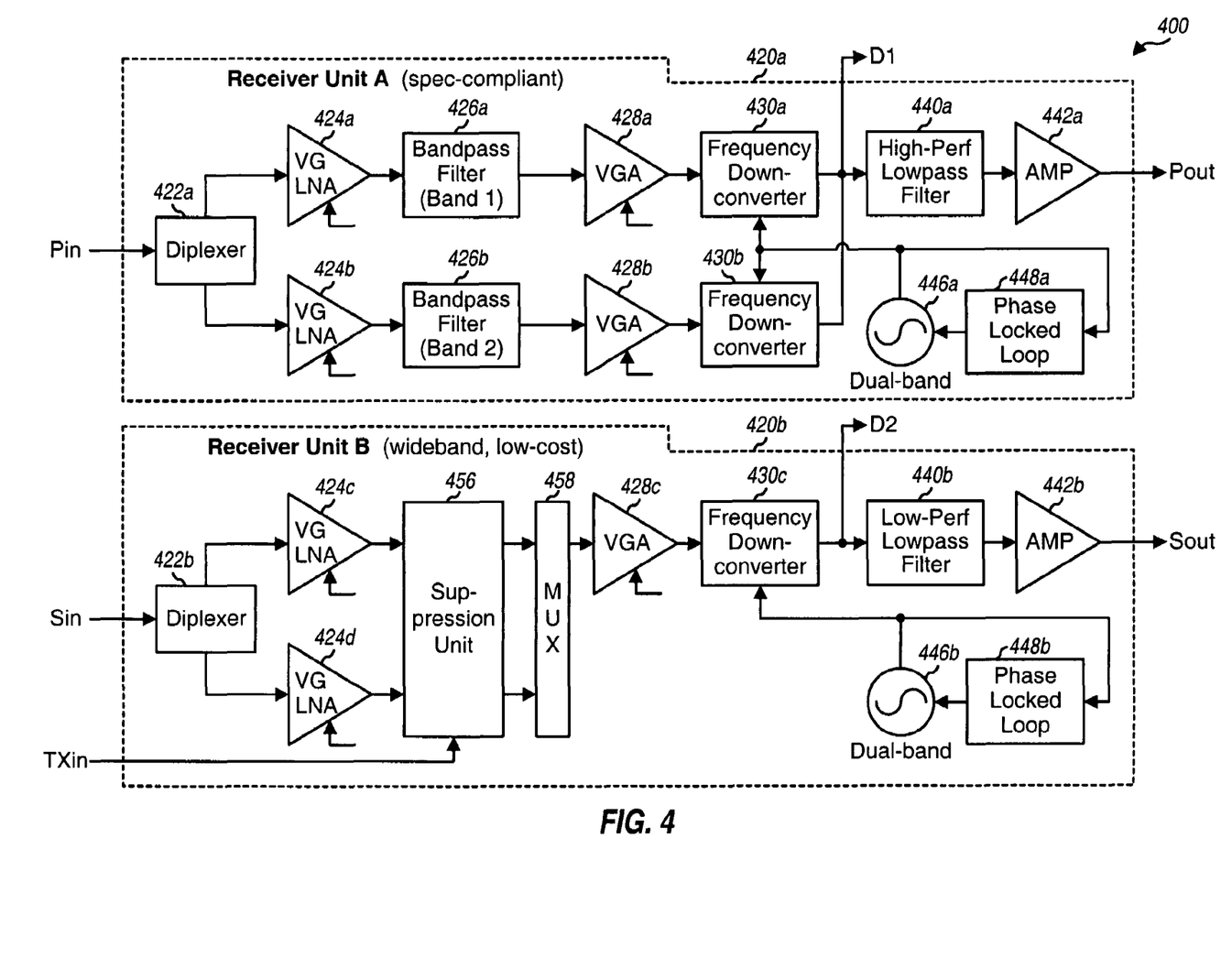
FIG. 4 shows a single-band, dual-path receiver.

FIG. 4 shows a block diagram of a dual-band, dual-path receiver 400, which may be used for both single-antenna terminal 110a and multi-antenna terminal 10b. Receiver 400 includes two receiver units 420a and 420b that may be used for receiver units 220a and 220b, respectively, in FIG. 2. In this case, both receiver units 420 are provided with the same received signal from antenna 212. Receiver units 420a and 420b may also be used for receiver units 320a and 320b, respectively, in FIG. 3. In this case, receiver units 420a and 420b are provided with different received signals from antennas 312a and 312b, respectively. Each receiver unit 420 supports operation on two frequency bands. For clarity, the description below is for the cellular and PCS bands. Receiver unit 420a is designated as the primary path, and receiver unit 420b is designated as the secondary/diversity path. The input signal for receiver unit 420a is referred to as the primary path input signal (Pin), and the input signal for receiver unit 420b is referred to as the secondary path input signal (Sin).

A receiver may implement a super-heterodyne architecture or a direct-to-baseband architecture. In the super-heterodyne architecture, the received signal is frequency downconverted in multiple stages, e.g., from RF to an intermediate frequency (IF) in one stage, and then from IF to baseband in another stage. In the direct-to-baseband architecture, the received signal is frequency downconverted from RF directly to baseband in one stage. The super-heterodyne and direct-to-baseband architectures may use different circuit blocks and/or have different circuit requirements. For clarity, the following description is for the direct-to-baseband architecture.

Receiver unit 420a is designed to meet applicable system requirements. For CDMA, IS-98D and cdma2000 specify a two-tone test and a single-tone test. For the two-tone test, two tones (or jammers) are located at +900 KHz and +1700 KHz from the center frequency of a CDMA waveform and are 58 dB higher in amplitude than the CDMA signal level. For the single-tone test, a single tone is located at +900 KHz from the center frequency of the CDMA waveform and is 72 dB higher in amplitude than the CDMA signal level. These tests define the linearity and dynamic range requirements for the receive path. In most systems, jammers are present for only a small fraction of the time and rarely reach the +58 or +72 dB level as specified by IS-98D and cdma2000. Nevertheless, receiver unit 420a may be designed to be IS-98D and cdma2000 compliant so that they can provide the specified performance for all operating conditions. Receiver unit 420b may be designed based on less stringent requirements. For example, receiver unit 420b may be designed to meet dynamic range and sensitivity requirements, albeit with an assumption that large amplitude jammers are not present in the received signal. Receiver unit 420b can provide good performance most of the time since large amplitude jammers are only present intermittently.

Within receiver unit 420a for the primary path, a diplexer 422a receives the Pin signal, provides a first cellular signal to a variable gain low noise amplifier (VG LNA) 424a, and provides a first PCS signal to a variable gain LNA 424b. Variable gain LNA 424a amplifies the first cellular signal with a gain G1ca. A bandpass filter (BPF) 426a filters the signal from LNA 424a to pass signal components in the band of interest and remove out-of-band noise and undesired signals. For two-way communication, signals are transmitted simultaneously on the forward link and reverse link. The transmit signal sent by the terminal on the reverse link is typically much larger in amplitude than the received signal for the forward link. Bandpass filter 426a may pass the RF components for the entire receive frequency range (e.g., from 869 to 894 MHz for the cellular band) and filter out and suppress the RF components for the transmit frequency range (e.g., from 824 to 849 MHz for the cellular band). Bandpass filter 426a thus has a passband that corresponds to the entire frequency range/band of interest (e.g., cellular). Because of the potentially large difference in the transmit and receive signal levels, bandpass filter 426a needs to provide a large amount of out-of-band rejection in order to meet system requirements. Bandpass filter 426a may be implemented with a surface acoustic wave (SAW) filter, which has a sharp roll-off and is commonly used for applications requiring large attenuation of out-of-band signals.

A variable gain amplifier (VGA) 428a amplifies the signal from bandpass filter 426a with a gain G1$cb$ and provides a conditioned cellular signal having the desired signal level. LNA 424a and VGA 428a provide the required amplification for the first cellular signal, which may vary by 90 dB or more. (The total required gain may be provided by LNA 424a, VGA 428a, and other circuit blocks and units such as DSP 250 or 350.) A downconverter 430a receives and frequency downconverts the conditioned cellular signal with a first LO signal (LO1) and provides a cellular baseband signal, which is also used as the D1 signal for the jammer detector. The frequency of the first LO signal is selected such that the signal component in the RF channel of interest is downconverted to baseband or near-baseband. For CDMA, each frequency band covers many RF channels, and each RF channel has a bandwidth of 1.23 MHz. A wireless terminal typically receives signal on one RF channel at any given moment.

Similarly, the first PCS signal is amplified by variable gain LNA 424b with a gain G1$pa$, filtered by a bandpass filter 426b, and further amplified by a VGA 428b with a gain G1$pb$ to obtain a conditioned PCS signal. Bandpass filter 426b may also be implemented with a SAW filter that passes the receive frequency range for the PCS band (from 1930 to 1990 MHz) and filters out other frequencies. For the direct-to-baseband architecture, each bandpass filter 426 attenuates the signal components in the transmit frequency range for the associated band. A downconverter 430b receives and frequency downconverts the conditioned PCS signal with the first LO signal from LO generator 446a and provides a PCS baseband signal.

A high-performance lowpass filter 440a then filters the cellular baseband signal or the PCS baseband signal to pass the signal components in the RF channel of interest and to remove noise and undesired signals that may be generated by the downconversion process. For the direct-to-baseband architecture, each bandpass filter 426 may pass the entire frequency band of interest, and lowpass filter 440a would then pass the RF channel of interest. Lowpass filter 440a is designed to have a relatively sharp roll-off in order to attenuate large amplitude jammers in the received signal. These jammers can take up a large portion of the dynamic range of the subsequent ADC if they are not sufficiently filtered. Lowpass filter 440a may be implemented with various filter types (e.g., Butterworth, elliptical, Chebychev, and so on), with the proper filter order and bandwidth, and with sufficient bias current to meet linearity and dynamic range requirements. For example, lowpass filter 440a may be implemented with a 5th order elliptical filter. Lowpass filter 440a provides a first filtered cellular/PCS baseband signal. An amplifier 442a amplifies and buffers the first filtered cellular/PCS baseband signal and provides a first output cellular/PCS baseband signal (Pout).

An LO generator 446a provides the first LO signal used to downconvert the Pin signal. LO generator 446a may be implemented with a voltage controlled oscillator (VCO) or some other type of oscillator. For example, LO generator 446a may be implemented with a dual-band VCO that can provide the first LO signal with the proper frequency, depending on whether the cellular or PCS band is selected. The dual-band VCO may be designed to span a frequency range of 3.3 to 4.4 GHz, which covers four times the lowest frequency in the cellular band and twice the highest frequency in the PCS band. The frequency of the first LO signal is selected such that the signal component in the RF channel of interest in the selected frequency band is downconverted to baseband or near-baseband. A phase locked loop (PLL) 448a receives the first LO signal and generates a first control signal for LO generator 446a such that the frequency and/or phase of the first LO signal is locked to a reference signal (not shown in FIG. 4).

Within receiver unit 420b for the secondary/diversity path, a diplexer 422b receives the Sin signal, provides a second cellular signal to a variable gain LNA 424c, and provides a second PCS signal to a variable gain LNA 424d. The second cellular signal is amplified by variable gain VGA 424c with again G2$c$ and processed by a suppression unit 456. Similarly, the second PCS signal is amplified by variable gain LNA 424d with a gain G2$p$ and processed by suppression unix 456. Suppression unit 456 suppresses large amplitude undesired signal components in the signals from LNAs 424c and 424d. A simple and low-cost design may be used for suppression unit 456. For example, since the transmit signal is the predominant undesired signal component, suppression unit 456 may be implemented with a transmit cancellation unit (which is also called an adaptive filter) described in commonly assigned U.S. patent application Ser. No. 10/792,171, entitled "Adaptive Filter for Transmit Leakage Signal Rejection," filed Mar. 2, 2004. This transmit cancellation unit receives a portion of the transmit signal (TXin), adjusts the gain and/or phase of this TXin signal, and subtracts the adjusted signal to suppress the transmit signal component in the Sin signal. Suppression unit 456 may also be implemented with a bandpass filter, a highpass filter, a ceramic filter, and so on.

A multiplexer (MUX) 458 selects either the filtered cellular signal or the filtered PCS signal from suppression unit 456, depending on the selected frequency band. A VGA 428c amplifies the selected signal from suppression unit 456 with a gain G2 and provides a conditioned cellular or PCS signal, depending on the selected frequency band. Multiplexer 458 symbolically shows the selection of one of the two bands. The band selection can be implemented in various manners. For example, two VGAs 428 coupled together may be used for the two bands, the VGA for the selected band may be enabled, and the other VGA may be disabled.

A downconverter 430c receives and frequency downconverts the conditioned cellular/PCS signal with a second LO signal (LO2) from an LO generator 446b and provides a cellular/PCS baseband signal, which is also used as the D2 signal for the jammer detector. The frequency of the second LO signal is selected such that the signal component in the RF channel of interest in the selected frequency band is downconverted to baseband or near-baseband. A low-performance lowpass filter 440b then filters the cellular/PCS baseband signal to pass the signal components in the RF channel of interest and to remove noise and undesired signals. Filter 440b may be implemented with lower order, less bias current, smaller size, and so on, than for filter 440a. This is because the requirements for filter 440b are less stringent than those for filter 440a. For example, filter 440b may be implemented with a 3rd order elliptical filter having more gradual attenuation than filter 440a. Filter 440b provides a second filtered cellular/PCS baseband signal. An amplifier 442b amplifies and buffers the second filtered cellular/PCS baseband signal and provides a second output cellular/PCS baseband signal (Sout).

An LO generator 446b provides the second LO signal used to downconvert the Sin signal. LO generator 446b may be implemented with a dual-band VCO, similar to LO generator 446a. However, LO generator 446b may be designed with more relaxed phase noise requirements. A PLL 448b receives the second LO signal and generates a second control signal for LO generator 446b. The same or different reference signals may be used for PLLs 448a and 448b.

Receiver unit 420a is designed to be compliant with applicable system requirements for both frequency bands. To meet these requirements, two separate receive paths are typically needed from diplexer 422a to lowpass filter 440a. Each of the two receive paths is designed for (or tuned to) the frequency band of interest in order to meet linearity, dynamic range, and sensitivity requirements. Two separate narrowband LNAs 424a and 424b are used for the two frequency bands and are designed for low noise figure, which typically requires narrowband matching at the frequency band of interest. Two separate narrowband VGAs 428a and 428b and two separate narrowband downconverters 430a and 430b are also typically used to achieve the desired linearity over a wide dynamic range. The narrowband circuit blocks may use tuned circuits, inductive degeneration, and other circuit techniques known in the art to achieve the desired performance. LO generator 446a is designed to have good phase noise performance. Good performance for these circuit blocks typically requires the use of larger-sized circuit components (e.g., larger capacitors, inductors and/or transistors) and large amounts of bias current.

Receiver unit 420b is designed to meet less stringent requirements, which assume that large amplitude jammers are not present. Receiver unit 420b can be designed for lower cost, lower power consumption, and smaller area than receiver unit 420a. Suppression unit 456 may be implemented with on-chip circuit components instead of with an external SAW filter (which may be needed for bandpass filters 426a and 426b). Separate narrowband LNAs 424c and 424d are used for the two frequency bands to attain low noise figures. However, these LNAs are typically small in size and consume small amount of bias current. Wideband VGA 428c and wideband downconverter 430c are shared by both frequency bands and can be implemented without using inductors (which typically occupy a large area) or using inductors of lower quality. Because of the less stringent linearity and dynamic range requirements, LNA 424c and 424d, VGA 428c, downconverter 430c, filter 440b, and amplifier 442b may be designed with smaller-sized circuit components (e.g., smaller capacitors) and less bias current. Also, because large amplitude jammers are assumed to be absent for receiver unit 420b, the overall gain may be distributed differently for the secondary/diversity path in a manner to further achieve low cost, low power, and small area.

FIG. 4 shows a specific design for receiver units 420a and 420b. In general, a receiver unit may perform signal conditioning using one or more stages of amplifier, filter, mixer, and so on, which may be arranged differently from that shown in FIG. 4. Moreover, a receiver unit may employ other circuit blocks not shown in FIG. 4 for signal conditioning.

Figure 7:
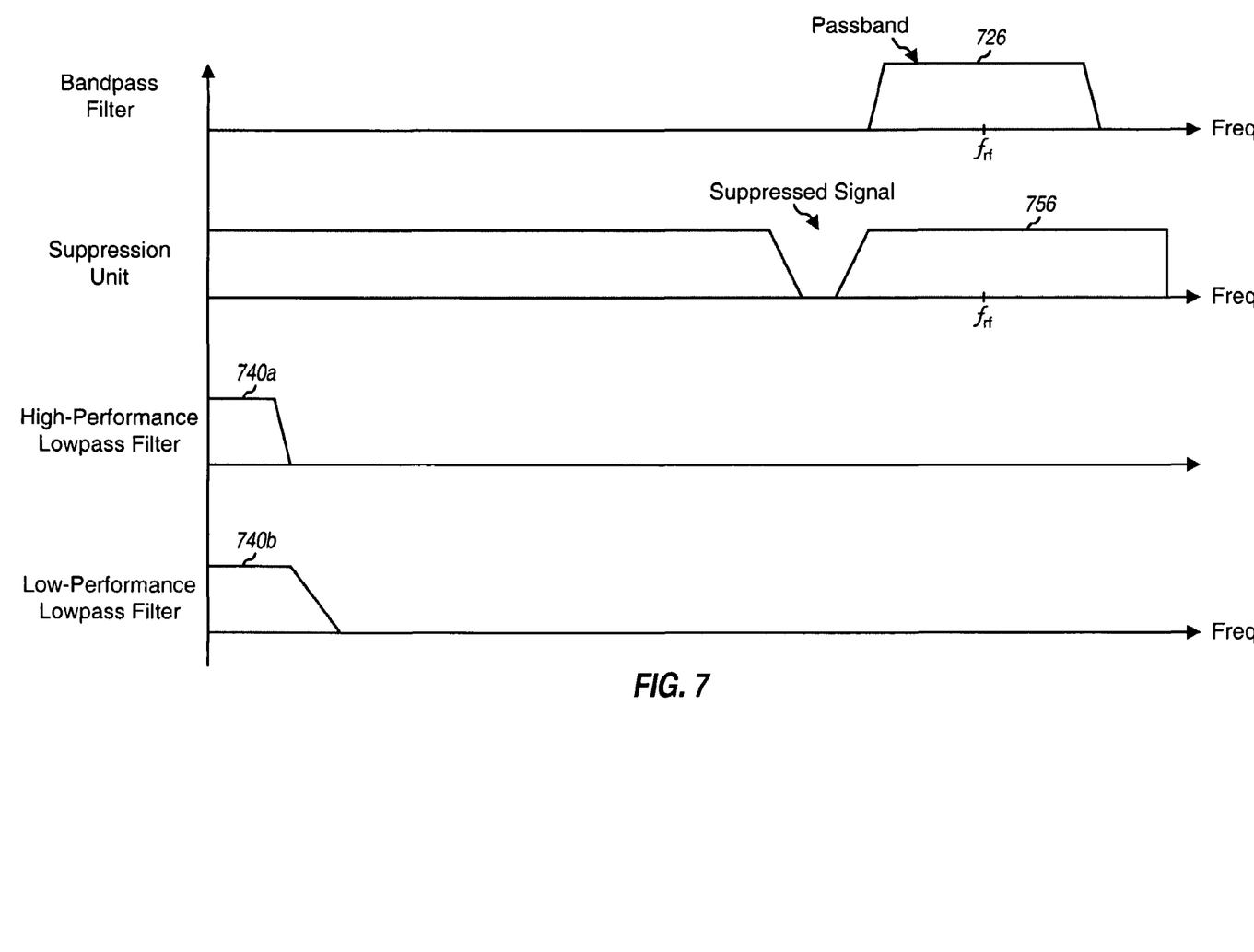
FIG. 7 shows frequency responses of filters within receiver units in FIG. 4.

FIG. 7 shows the frequency responses of various filters within receiver units 420a and 420b. Bandpass filter 426a has a frequency response 726, which is characterized by a passband that spans the entire frequency range/band of interest (e.g., cellular or PCS) and a sharp roll-off. Suppression unit 456 has a frequency response 756 that also passes the signal components in the frequency range/band of interest and suppresses the transmit signal. For simplicity, the frequency response of suppression unit 456 is represented as a notch filter in FIG. 7. High-performance lowpass filter 440a has a frequency response 740a, which is characterized by a passband for one RF channel and a relatively sharp roll-off. Low-performance lowpass filter 440b has a frequency response 740b, which is characterized by a passband for one RF channel and a more gradual roll-off.

A receiver may also be designed to support more than two frequency bands based on the concept described above for receiver 400.

Figure 5:
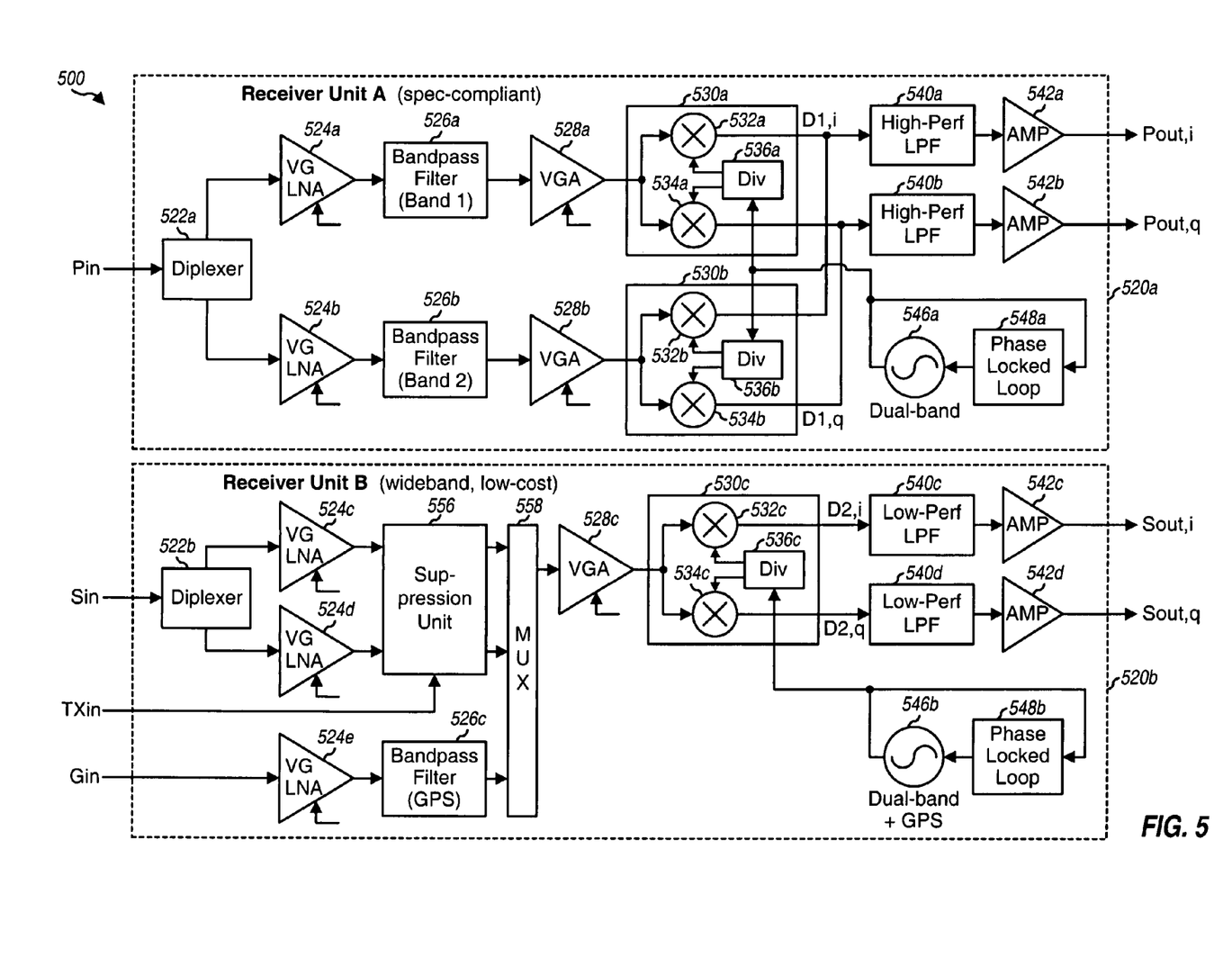
FIG. 5 shows a dual-band, dual-path plus GPS receiver.

FIG. 5 shows a block diagram of a dual-band plus GPS, dual-path receiver 500. Receiver 500 includes two receiver units 520a and 520b that may be used for receiver units 220a and 220b, respectively, of single-antenna terminal 110a in FIG. 2, and for receiver units 320a and 320b, respectively, of multi-antenna terminal 110b in FIG. 3. Each receiver unit 520 supports operation on two frequency bands. Receiver unit 520b has a receive path that is shared by both frequency bands plus GPS.

Receiver unit 520a for the primary path is similar in design to receiver unit 420a in FIG. 4. However, FIG. 5 shows a quadrature design for downconverters 530a and 530b and the subsequent baseband circuit blocks. Within each downconverter 530, a mixer 532 receives and downconverts the conditioned signal from an associated VGA 528 with an inphase first LO signal (ILO1) from a divider unit 536 and provides an inphase (I) baseband signal. Similarly, a mixer 534 receives and downconverts the conditioned signal from the same VGA 528 with a quadrature first LO signal (QLO1) from divider unit 536 and provides a quadrature (Q) baseband signal. The I and Q baseband signals (from both downconverters 530a and 530b) are filtered by high-performance lowpass filters 540a and 540b, respectively, and further amplified by amplifiers 542a and 542b, respectively, to obtain output I and Q cellular/PCS baseband signals (Pout,i and Pout,q).

Receiver unit 520b for the secondary/diversity path is similar in design to receiver unit 420b in FIG. 4. However, receiver unit 520b includes three front-end paths for cellular, PCS, and GPS. The front-end paths for the cellular and PCS are implemented with a diplexer 522b, variable gain VGAs 524c and 524d, a suppression unit 556, and a multiplexer 558. These circuit blocks operate as described above for receiver unit 420b. For the third front-end path for GPS, a GPS signal (Gin) is amplified by a variable gain LNA 524e with a gain G2g and filtered by a bandpass filter 526c. Bandpass filter 526c may be implemented with a SAW filter or some other type of filter. Multiplexer 558 selects the cellular, PCS, or GPS signal, depending on the selected system/band. A VGA 528c amplifies the signal from multiplexer 558 with a gain G2 and provides a conditioned cellular, PCS, or GPS signal, depending on which one of the three receive paths is selected.

FIG. 5 also shows a quadrature design for frequency downconverter 530c and the subsequent baseband circuit blocks for the secondary/diversity path. Downconverter 530c is implemented with mixers 532c and 534c and a divider unit 536c, which operate as described above for downconverters 530a and 530b. Downconverter 530c performs quadrature downconversion of the conditioned cellular/PCS/GPS signal from VGA 528c and provides I and Q baseband signals, which are filtered by low-performance lowpass filters 540c and 540d, respectively, and further amplified by amplifiers 542c and 542d, respectively, to obtain output I and Q cellular/PCS/GPS baseband signals (Sout,i and Sout,q).

LO generator 546b may be implemented with a VCO that can span a frequency range of 3.15 to 4.4 GHz, which covers four times the cellular band, twice the PCS band, and twice the GPS band. LO generator 546b may be designed with more relaxed phase noise requirements than LO generator 546a.

Receiver unit 520b is wideband and designed for lower cost, lower power consumption, and smaller area than receiver unit 520a. Wideband VGA 528c and wideband downconverter 530c are shared for both frequency bands and GPS.

Receivers 400 and 500 each include two LO generators that can be operated independently. Moreover, each of the two LO generators covers all of the frequency bands of interest. This design allows the primary and secondary paths to simultaneously process two signals on two different RF channels. This capability may be useful for various applications. For example, a terminal with this capability can receive two simultaneous transmissions on two RF channels from one or two systems. As another example, the terminal with this capability can perform mobile-assisted hand-off (MAHO) to select the best base stations to communicate with. The terminal can receive a transmission from a serving base station with the primary path and can simultaneously search for signals from other base stations with the secondary/diversity path. This would then allow the terminal to initiate a hand-off to another base station that is better than the serving base station, if one is found. If independent operation of the primary and secondary paths is not needed, then one LO generator can be shared by the primary and secondary paths.

Figure 6:
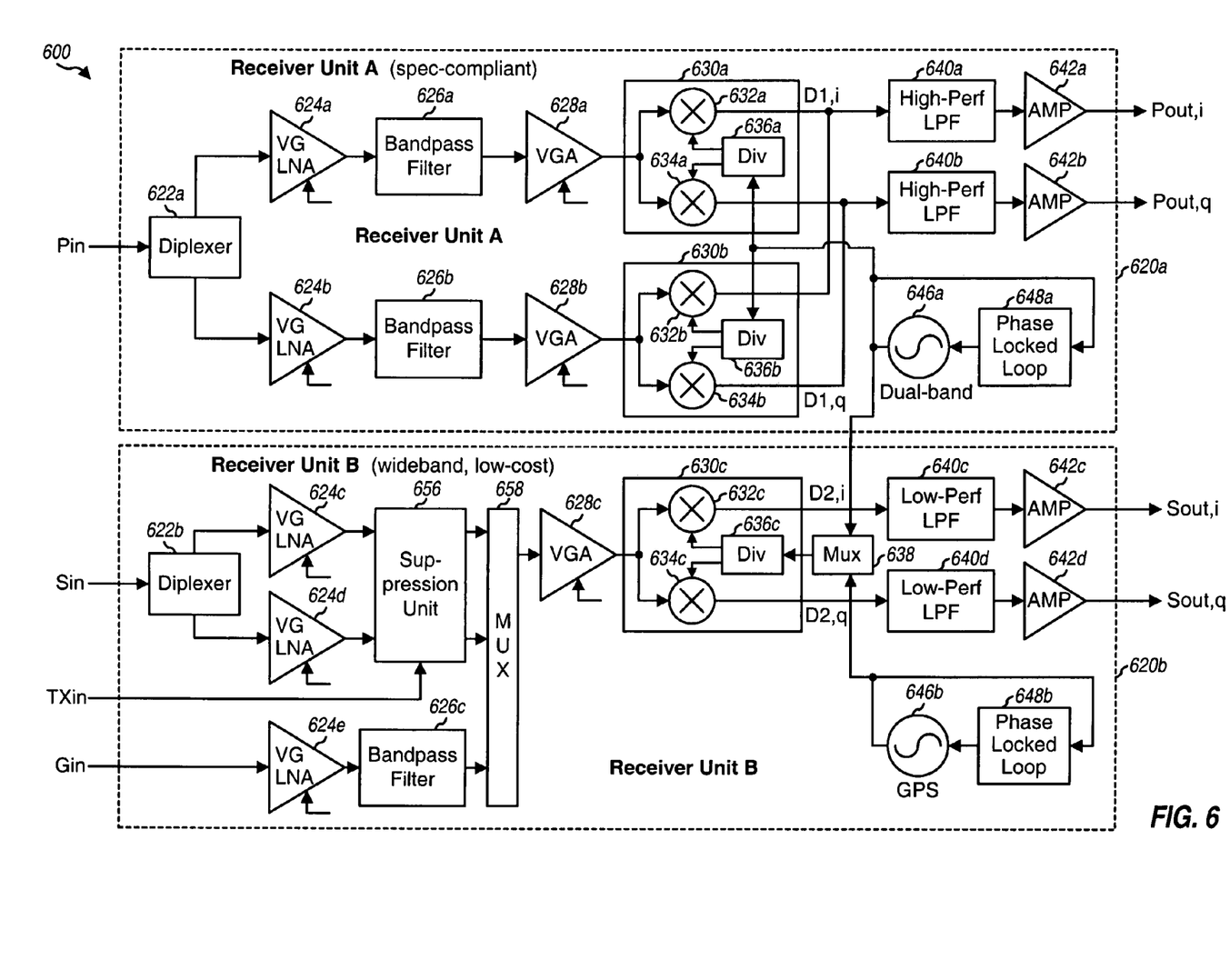
FIG. 6 shows a dual-band, dual-path plus GPS receiver with a shared local oscillator (LO) generator.

FIG. 6 shows a block diagram of a dual-band plus GPS, dual-path receiver 600 with a shared LO generator. Receiver 600 includes two receiver units 620a and 620b that may be used for receiver units 220a and 220b, respectively, of single-antenna terminal 110a in FIG. 2, and for receiver units 320a and 320b, respectively, of multi-antenna terminal 110b in FIG. 3. Receiver unit 620a is for the primary path and is implemented in the same manner as receiver unit 520a in FIG. 5.

Receiver unit 620b is for the secondary/diversity path and is implemented in similar manner as receiver unit 520b in FIG. 5. Receiver unit 620b further includes a multiplexer 638 that receives the first LO signal from an LO generator 646a and the second LO signal from an LO generator 646b, provides the first LO signal to a downconverter 630c if the cellular or PCS band is selected, and provides the second LO signal if GPS is selected. LO generator 646a may be implemented with a VCO that can span a frequency range of 3.3 to 4.4 GHz, which covers four times the cellular band and twice the PCS band. LO generator 646b may be implemented with a VCO that covers 3.15 GHz, which is twice the GPS band. The design for LO generator 646b and PLL 648b can be simplified if they are required to cover only GPS (instead of GPS, cellular, and PCS).

Figure 8:
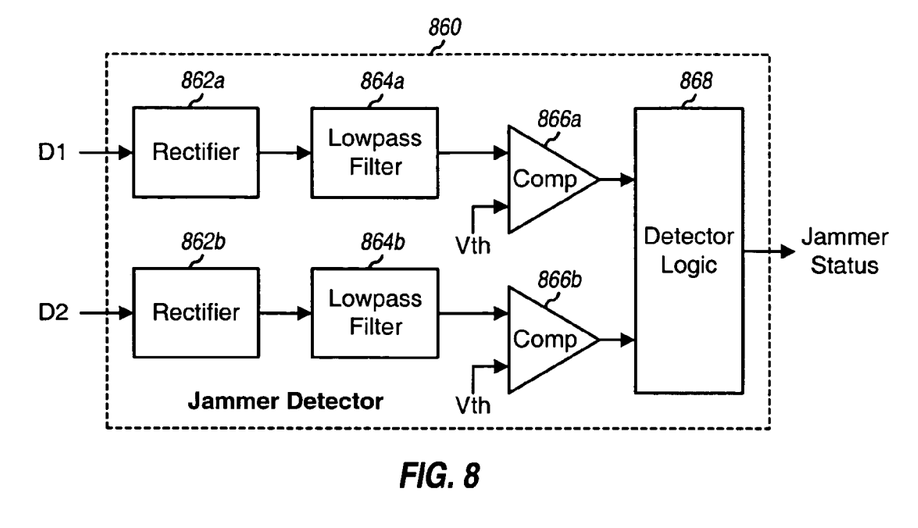
FIG. 8 shows a jammer detector.

FIG. 8 shows a block diagram of a jammer detector 860, which may be used for jammer detectors 260 and 360 in FIGS. 2 and 3. The D1 and D2 signals from the first and second receiver units are rectified by rectifiers 862a and 862b, filtered by lowpass filters 864a and 864b, and provided to comparators 866a and 866b, respectively. Each rectifier 862 converts its input signal from a sinusoidal signal (with positive and negative amplitude) to a single-ended signal (with only positive amplitude) and may be implemented with a diode. Each lowpass filter 864 may be implemented, for example, with a single-order lowpass filter of an appropriate bandwidth (e.g., several hundred Hertz). Each comparator 866 compares its filtered signal against a threshold level (Vth) and provides an output signal, which is (1) logic high ('1') if the filtered signal amplitude is larger than the threshold level, indicating the presence of large amplitude jammers in the received signal, and (2) logic low ('0') otherwise. Detector logic 868 combines the output signals of comparators 866a and 866b and provides the jammer status signal to control unit 262 or 362.

In general, jammer detection may be performed based on (1) only the D1 signal, (2) only the D2 signal, or (3) both the D1 and D2 signals. The filtered signals may be compared against the threshold level as shown in FIG. 8 to obtain a 1-bit output signal. The jammer status signal from jammer detector 860 may be used to enable or disable each of the two receiver units. The filtered signals from lowpass filters 864a and 864b may also be digitized with an ADC to obtain multiple bits of resolution. The circuit blocks in the two receiver units may be adjusted (e.g., with different gains, bias currents, and so on) based on whether or not large amplitude jammers are detected and/or the specific signal level of the jammers.

Figure 9:
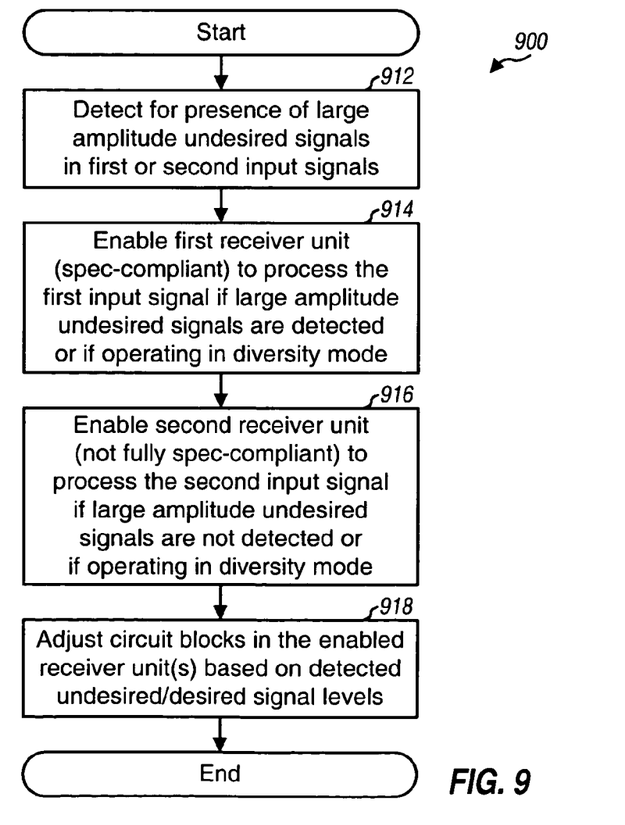
FIG. 9 shows a process for operating two receiver units in a wireless terminal.

FIG. 9 shows a flow diagram of a process 900 for operating two receiver units in a wireless terminal. The presence of large amplitude jammers in a first input signal or a second input signal is detected (block 912). The first and second input signals may be from (1) one antenna for a single-antenna terminal or (2) two antennas for a multi-antenna terminal. The first receiver unit (which is spec-compliant, e.g., IS-98D compliant) is enabled to process the first input signal if large amplitude jammers are detected (block 914). The second receiver unit (which is not fully spec-compliant) is enabled to process the second input signal if large amplitude jammers are not detected (block 916). The first and second receiver units may both be enabled if the multi-antenna terminal is operating in a diversity mode and the received signals from both antennas are to be processed simultaneously. Electrical characteristics (e.g., gains, bias currents, and so on) of the circuit blocks in the enabled receiver unit(s) may be adjusted based on the detected jammer signal level and/or the desired signal level (block 918).

For simplicity, the description above is for a direct-to-baseband architecture. The concepts described herein may also be used for a super-heterodyne architecture. In this case, for the primary path, one variable gain LNA and one RF to IF downconverter may be provided for each frequency band. The input signal for each frequency band is downconverted to a predetermined IF and filtered with a common bandpass filter. The bandpass filter may be implemented with a SAW filter and may perform RF channel selection (i.e., has a passband corresponding to one RF channel, instead of an entire frequency band). Another downconverter then frequency downconverts the IF signal to baseband. If the RF channel selection is performed by the bandpass filter, then the requirements for the lowpass filter may be relaxed. For the secondary receive path, the circuit blocks may be designed based on less stringent requirements, which assume the absence of large amplitude jammers in the received signal.

The diversity receiver described herein may be used for a wireless terminal to receive forward link transmissions from base stations. The diversity receiver may also be used for a base station to receive reverse link transmissions from user terminals.

The diversity receiver described herein may be used for various wireless communication systems such as a CDMA system, a TDMA system, a GSM system, an AMPS system, a multiple-input multiple-output (MIMO) system, an orthogonal frequency division multiplexing (OFDM) system, an orthogonal frequency division multiple access (OFDMA) system, a wireless local area network (WLAN), and so on.

A large portion of a diversity receiver (possibly all circuit blocks except SAW filters, control units 262 and 362, and DSPs 250 and 350) may be implemented on one or more RF integrated circuits (RFICs). The diversity receiver may also be fabricated with various IC process technologies such as complementary metal oxide semiconductor (CMOS), bipolar junction transistor (BJT), bipolar-CMOS (BiCMOS), silicon germanium (SiGe), gallium arsenide (GaAs), and so on.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device comprising:
a first receiver unit operable to receive and amplify first and second input signals for first and second frequency bands to obtain first and second amplified signals, respectively, and to downconvert the first and second amplified signals from radio frequency (RF) to baseband and provide first and second baseband signals, respectively, wherein the first receiver unit includes replicated RF circuit blocks for downconverting from RF to baseband for each of the first and second frequency bands; and
a second receiver unit operable to receive and amplify a third input signal for the first or second frequency band to obtain a third amplified signal, and to downconvert the third amplified signal from RF to baseband and provide a third baseband signal, wherein the second receiver unit includes at least one RF circuit block for downconverting from RF to baseband that is shared by the first and second frequency bands.

2. The device of claim 1, wherein the second receiver unit includes a wideband frequency downconverter that is shared by the first and second frequency bands.

3. The device of claim 1, wherein the second receiver unit includes a wideband variable gain amplifier (VGA) that is shared by the first and second frequency bands.

4. The device of claim 1, wherein the first receiver unit is compliant with system requirements for a receiver and the second receiver unit is non-compliant with at least some of the system requirements.

5. The device of claim 4, wherein the system requirements are specified by a single-tone test and a two-tone test in IS-98D.

6. The device of claim 1, wherein the first frequency band is a cellular band and the second frequency band is a Personal Communication System (PCS) band.

7. The device of claim 1, wherein the second receiver unit is further operable to receive, amplify, and downconvert a Global Positioning System (GPS) signal and provide a downconverted GPS signal.

8. The device of claim 1, wherein the first, second, and third input signals are from one antenna.

9. The device of claim 1, further comprising:
a detector operative to detect for presence of large amplitude undesired signals in the first or second input signal; and
a control unit operative to enable the first receiver unit if large amplitude undesired signals are detected and enable the second receiver unit if large amplitude undesired signals are not detected.

10. The device of claim 1, wherein the first and second input signals are from a first antenna and the third input signal is from a second antenna, and wherein the first receiver unit is for a primary path and the second receiver unit is for a diversity path.

11. The device of claim 10, wherein the second receiver unit is enabled for a diversity mode with signals from the first and second antennas being processed concurrently.

12. The device of claim 1, wherein the first and second receiver units are operable to downconvert the first, second, and third amplified signals directly from RF down to baseband.

13. The device of claim 1, wherein the second receiver unit is biased with less current and occupies a smaller area than the first receiver unit.

14. An integrated circuit comprising:
a first receiver unit including
a first amplifier operable to receive and amplify a first input signal for a first frequency band and provide a first amplified signal,
a second amplifier operable to receive and amplify a second input signal for a second frequency band and provide a second amplified signal,
a first downconverter operable to frequency downconvert the first amplified signal and provide a first baseband signal, and
a second downconverter operable to frequency downconvert the second amplified signal and provide a second baseband signal; and
a second receiver unit including
a third amplifier operable to receive and amplify a third input signal for the first or second frequency band and provide a third amplified signal, and
a third downconverter operable to frequency downconvert the third amplified signal and provide a third baseband signal, wherein the third amplifier and third downconverter are wideband and are shared by the first and second frequency bands.

15. The integrated circuit of claim 14, wherein the first receiver unit is compliant with system requirements for a receiver and the second receiver unit is non-compliant with the system requirements.

16. The integrated circuit of claim 14, wherein the first and second input signals are from a first antenna and the third input signal is from a second antenna.

17. The integrated circuit of claim 14, wherein the first amplifier and the first downconverter are narrowband and cover the first frequency band, and wherein the second amplifier and the second downconverter are narrowband and cover the second frequency band.

18. The integrated circuit of claim 14, wherein the third amplifier is further operable to receive and amplify a Global Positioning System (GPS) signal and provide an amplified GPS signal, and wherein the third downconverter is further operable to frequency downconvert the amplified GPS signal and provide a GPS baseband signal.

19. The integrated circuit of claim 14, wherein the second receiver unit further includes
a suppression unit operable to receive a first radio frequency (RF) signal for the first frequency band, suppress a first transmit signal component in the first RF signal, and provide the third input signal having the first transmit signal component suppressed.

20. The integrated circuit of claim 19, wherein the suppression unit is further operable to receive a second RF signal for the second frequency band, suppress a second transmit signal component in the second RF signal, and provide the third input signal having the second transmit signal component suppressed.

21. The integrated circuit of claim 14, wherein
the first receiver unit further includes a first lowpass filter operable to filter the first or second baseband signal and provide a first filtered signal, and wherein
the second receiver unit further includes a second lowpass filter operable to filter the third baseband signal and provide a second filtered signal.

22. The integrated circuit of claim 21, wherein the second lowpass filter has a lower order than the first lowpass filter.

23. The integrated circuit of claim 21, wherein the second lowpass filter has lower dynamic range and lower power consumption than the first lowpass filter.

24. The integrated circuit of claim 14, wherein the third amplifier and the third downconverter are biased with less current than the first amplifier and the first downconverter, respectively.

25. The integrated circuit of claim 14, wherein the third amplifier and the third downconverter are implemented with smaller-sized circuit components than the first amplifier and the first downconverter, respectively.

26. The integrated circuit of claim 14, further comprising:
a first local oscillator (LO) generator operable to provide a first LO signal for the first and second downconverters, wherein the first LO generator covers the first and second frequency bands; and
a second LO generator operable to provide a second LO signal for the third downconverter, wherein the second LO generator also covers the first and second frequency bands.

27. The integrated circuit of claim 26, wherein the first LO generator has better phase noise performance than the second LO generator.

28. The integrated circuit of claim 14, further comprising:
a local oscillator (LO) generator operable to provide an LO signal for the first, second, and third downconverters, wherein the LO generator covers the first and second frequency bands.

29. An apparatus comprising:
means for receiving and amplifying a first input signal for a first frequency band to obtain a first amplified signal;
means for receiving and amplifying a second input signal for a second frequency band to obtain a second amplified signal;
means for downconverting the first amplified signal from radio frequency (RF) to baseband to provide a first baseband signal;
means for downconverting the second amplified signal from RF to baseband to provide a second baseband signal;
means for receiving and amplifying a third input signal for the first or second frequency band to obtain a third amplified signal; and
means for downconverting the third amplified signal from RF to baseband to provide a third baseband signal, wherein the means for receiving and amplifying the third input signal and the means for downconverting the third amplified signal include at least one RF circuit block that is shared by the first and second frequency bands.

30. The apparatus of claim 29, wherein the first and second baseband signals are compliant with system requirements for a receiver and the third baseband signal is non-compliant with the system requirements.

31. A method of operating multiple receiver units in a wireless device, comprising:
detecting for presence of large amplitude undesired signals in a first input signal or a second input signal;
enabling a first receiver unit to process the first input signal if large amplitude undesired signals are detected; and
enabling a second receiver unit to process the second input signal if large amplitude undesired signals are not detected, wherein the first receiver unit includes at least two receive paths for downconverting from RF to baseband for at least two frequency bands, and wherein the second receiver unit includes one shared receive path for downconverting from RF to baseband for the at least two frequency bands.

32. The method of claim 31, wherein the first and second input signals are from one antenna.

33. The method of claim 31, wherein the first input signal is from a first antenna and the second input signal is from a second antenna.

* * * * *